Oct. 17, 1950  E. W. PAESSLER  2,526,152
AUTOMATIC POSITION CONTROL APPARATUS
Filed July 28, 1944  5 Sheets-Sheet 1

INVENTOR.
ERIC W. PAESSLER
BY C. H. Suydam
AGENT

Oct. 17, 1950  E. W. PAESSLER  2,526,152
AUTOMATIC POSITION CONTROL APPARATUS
Filed July 28, 1944  5 Sheets-Sheet 2

INVENTOR.
ERIC W. PAESSLER
BY C. H. Suydam
AGENT

Oct. 17, 1950  E. W. PAESSLER  2,526,152
AUTOMATIC POSITION CONTROL APPARATUS
Filed July 28, 1944  5 Sheets-Sheet 3

INVENTOR.
ERIC W. PAESSLER
BY C. H. Suydam
AGENT

Oct. 17, 1950 E. W. PAESSLER 2,526,152
AUTOMATIC POSITION CONTROL APPARATUS
Filed July 28, 1944 5 Sheets-Sheet 4

INVENTOR.
ERIC W. PAESSLER
BY C. H. Suydam
AGENT

Oct. 17, 1950     E. W. PAESSLER     2,526,152
AUTOMATIC POSITION CONTROL APPARATUS Filed July 28, 1944     5 Sheets-Sheet 5

INVENTOR.
ERIC W. PAESSLER
BY
C. H. Suydam
AGENT

Patented Oct. 17, 1950

2,526,152

UNITED STATES PATENT OFFICE 2,526,152

AUTOMATIC POSITION CONTROL APPARATUS

Eric W. Paessler, Hackensack, N. J., assignor to Federal Telephone and Radio Corporation, New York, N. Y., a corporation of Delaware Application July 28, 1944, Serial No. 547,058

8 Claims. (Cl. 192—142)

This invention relates to automatic position control apparatus and in particular to mechanisms adapted to automatically tune a radio transmitter or receiver to a predetermined frequency.

Many types of automatic tuning and control mechanisms have been developed. In general the mechanisms have been used for controlling all possible settings of apparatus which require a movement of 360° or less, e. g. condensers. On the other hand, the apparatus of my invention is capable of adjusting a control shaft of a circuit element through any number of degrees depending upon the design of the apparatus and the requirements to be met. For example, it is frequently desirable to vary the inductance of a multi-turn single layer coil by the continuous rotation of a shaft on which is mounted a roller or grooved pulley, the latter making continuous contact with the turns of the coil as it rotates. Variable condensers of the type wherein two concentric cylindrical electrodes move longitudinally, one with respect to the other, may also be adjusted by my apparatus. Similarly, inductances employing permeability tuning may also be adjusted. Many other applications of my invention will occur to those skilled in the art, but my invention will be described as it relates to the tuning of electrical circuits.

Among the objects and features of my invention are the following.

1. To provide a mechanism for automatically changing the constants of an electrical circuit to any one of a number of predetermined values.

2. To provide a mechanism for producing a rotation of any predetermined number of degrees as, for example, when varying the tuning of an electrical circuit element from one value to another.

3. To provide a mechanism for automatically selecting that direction of rotation of a shaft which will most rapidly produce a desired result.

4. To provide a mechanism which may be adjusted to a plurality of predetermined settings by a very simple means.

Other objects and features of my invention will become apparent as I proceed with the specifications.

Figure 1:
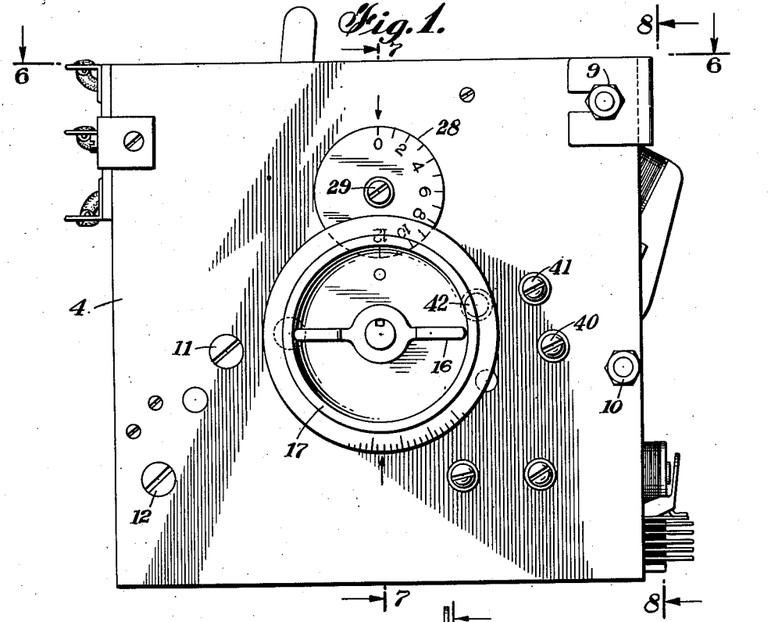
Figure 2:
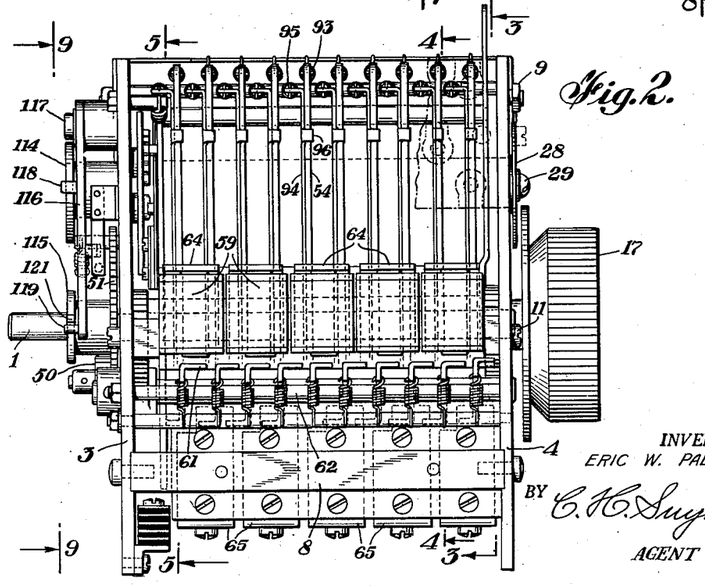

In accordance with my invention two shafts are rotated at different fixed relative rates. The shafts mount a plurality of pairs of cams, one pair for each desired setting of the apparatus to be controlled. A separate detent mechanism is associated with each pair of cams. For any given operation, the detent mechanism associated with the first shaft of the pair of shafts is held inoperative until the second shaft of said pair has rotated to a predetermined position. The selective detent mechanism associated with the second shaft then operates to place the detent mechanism of the first shaft in an operative condition. During the following rotation of the first shaft its associated detent mechanism operates to stop its rotation. The details by which these operations are performed are illustrated in the accompanying drawings wherein Figs. 1 and 2 illustrate an end and a side elevation, respectively, of the apparatus of my invention whereon are indicated the planes from which certain illustrative sections of the apparatus are viewed.

Referring to the figures, the two rotating shafts mentioned above are represented by reference characters 1 and 2. The shaft 1 is the one to which a mechanical linkage, not shown, is connected for in turn varying the constant of an electrical circuit element to a predetermined value. This shaft 1 rotates at a considerably higher speed than does shaft 2, to which it is connected by gearing as hereinafter described, the rotation of shaft 2 and the devices mounted thereon being employed to control the motion of shaft 1 whereby the latter will cease rotation after a predetermined number of degrees. Both shafts are journaled in end plates, or frame members, 3 and 4. The frame members are spaced apart and rigidly held together by a plurality of spacing rods illustrated in cross section in Fig. 4 by reference characters 5, 6, 7 and 8. The spacing members 7 and 8 are made of square cross sectional material in order to facilitate the mounting of certain parts on the flat sides thereof. The end plates are held to the spacing members by nuts and screws 9, 10, 11 and 12 as illustrated in Fig. 1 which shows an elevational view of end plate 4. End plate 3 is held to the spacers by similar means.

Figures 7, 8, 10:
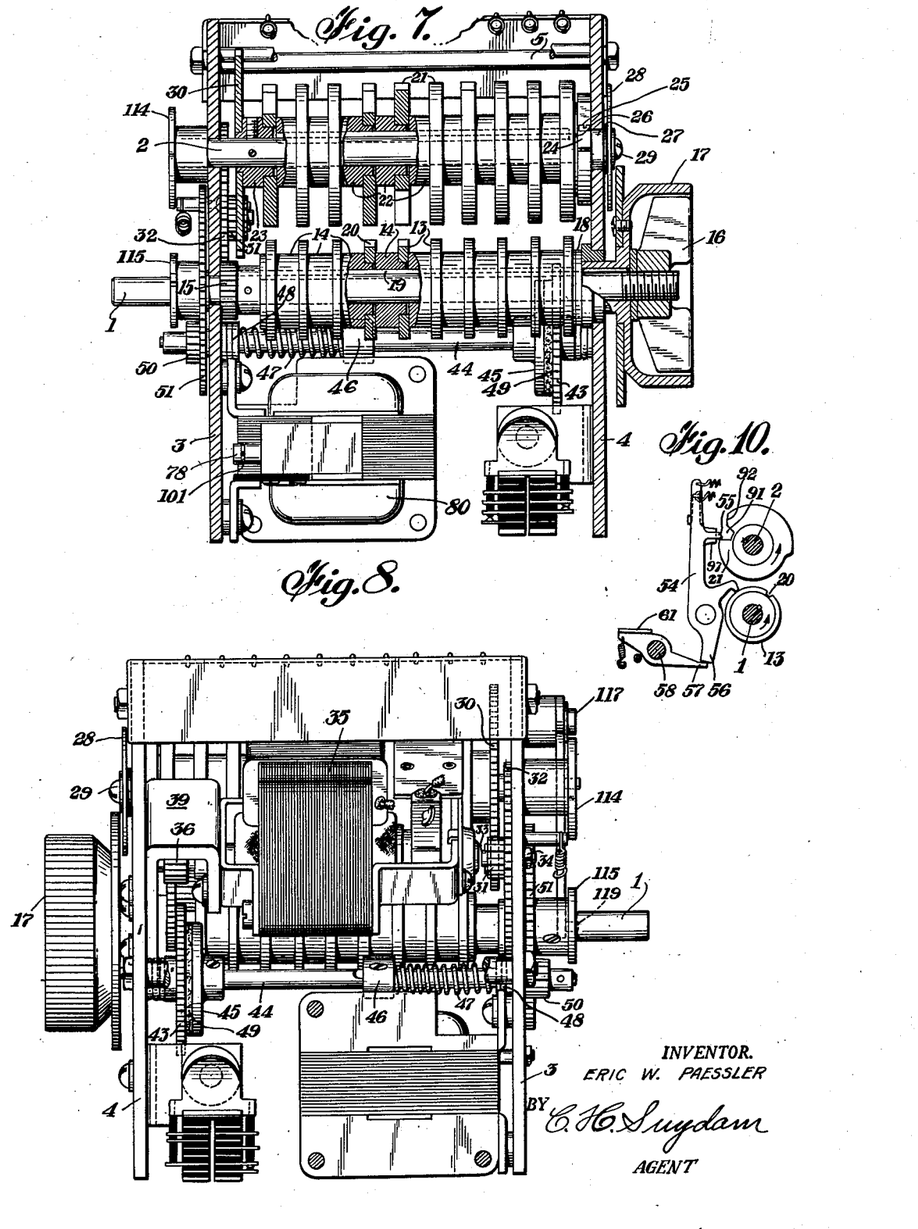
Fig. 7 is a sectional view of my apparatus as taken from the plane 7—7 in Fig. 1.
Fig. 8 is a side elevation taken from the plane 8—8 of Fig. 1.
Fig. 10 is a view of certain detent elements of the control mechanism at a selected time in its operation.

Referring particularly to Fig. 7 there is mounted upon shaft 1 a plurality of cams 13, the cams being spaced apart along the shaft by stepped spacers 14. It will be noticed that the cams do not bear upon the shaft directly but on the smaller diameter of the stepped spacers whereon they are free to rotate when not in a clamped position. In order to clamp the cams and spacers to shaft 1 and thereby form essentially a unitary structure, a gear 15 with an integral hub is pinned to the shaft at one end thereof. At the other end of the shaft a wing nut 16 applies pressure through the hub of hand knob 17 to a washer 18 thereby clamping the cams and spacers against the hub of gear 15. All of the spacers 14 and the knob 17 are prevented from rotating relative to the shaft 1 by the key or feather 19.

On the periphery or cam surface of each cam there is provided a notch 20. The relative location of this notch with respect to a fixed radius of the shaft determines in part the ultimate amount of rotation which the shaft makes in arriving at the final predetermined position of the tuning element as will be hereinafter described.

On shaft 2 a number of cams 21 and stepped separators 22 are mounted in a manner similar to that described in connection with shaft 1. A collar 23 is pinned to one end of shaft 2 and a split collar 24 is clamped by screw 25 to the other end of the shaft. A spring washer 26 is positioned between the clamp 24 and the end cam to provide a certain amount of friction between the cams 21 and the separators 22. This friction should be sufficient to effectively restrain any relative motion of the cams during normal operation but not so great as to prevent their motion when sufficient pressure is applied during preliminary adjustment of the apparatus. Longitudinal motion of the shaft 2 is prevented by the radial and thrust bearing 27 positioned between end plate 4 and the dial 28, the dial being fastened to the end of the shaft by screw 29.

Mounted on collar 23 is a gear 30. As shown more clearly in Figs. 4 and 5, this gear mates with a pinion 31 mounted together with gear 32 on stub shaft 33. The stub shaft may be fastened to the end plate 3 by turning a shoulder on the shaft and passing the reduced shaft portion through a hole in the end plate 3 and fastening by a nut 34, see Fig. 8. Gear 32 mates with the pinion 15 mounted on shaft 1. This gear linkage between shafts 1 and 2 maintains a constant relative rotational speed between the two shafts and in the illustrated embodiment of my invention is such that shaft 1 makes 24 revolutions to one revolution of shaft 2.

Figure 3:
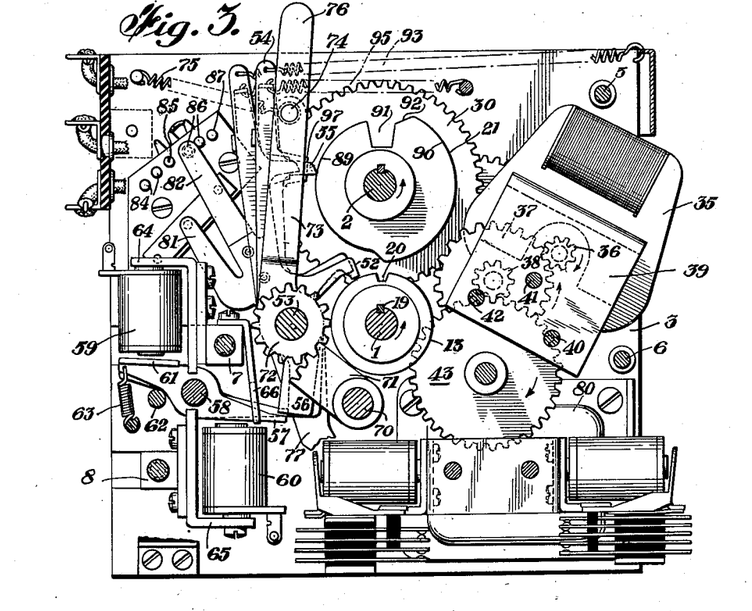
Fig. 3 is a sectional view of the apparatus taken from the plane 3—3 of Fig. 2.

A motor drive 35 together with reducing gears is shown in Fig. 3. Pinion 36 connected to the motor shaft drives gear 37 which, together with pinion 38, is mounted on a stub shaft fastened to bracket 39, the latter serving to mount the motor on the end plate 4. The bracket is fastened to the frame by means of screws 40, 41 and 42. Pinion 38 drives gear 43 which in turn drives the shaft 1 through a slipping clutch mechanism as follows.

Referring to Fig. 8 a shaft 44 is journaled in end plates 3 and 4. Rigidly mounted on the shaft 44 by set screws are a clutch plate 45 and a collar 46. Rotatably mounted on shaft 44 is the aforementioned gear 43. A thrust bearing is positioned on shaft 44 between end plate 4 and the hub of gear 43. At the other end of the shaft 44 a compression spring 47 loosely mounted over the shaft bears at one end against the collar 46 and at the other end against a second thrust bearing 48, the latter in turn bearing against end plate 3. The compressive force exerted by spring 47 may be suitably adjusted by fastening collar 46 at the proper point along shaft 44. A friction disc 49, composed of a suitable material such as cork, is positioned between the face of gear 43 and the clutch plate 45. It will be observed that the compression spring 47 forces the clutch plate 45 against the gear 43 through the medium of the friction disc and the shaft 44 may thus be driven by the gear. During the operation of the control apparatus, shaft 1 becomes locked in a given predetermined position and this in turn stops the rotation of shaft 44. However, due to the friction disc 49 gear 43 will continue to rotate for a short period of time. This continued rotation prevents unduly heavy loads being placed on the gears and their shafts as is well understood. Pinion 50 is fastened to an extension of shaft 44 by suitable means such as, for example, a taper pin passing through the hub of the pinion and the shaft. Pinion 50 in turn drives the shaft 1 through the gear 51. The gear 51 may be mounted on the shaft by suitable means such as a set screw.

Figure 4:
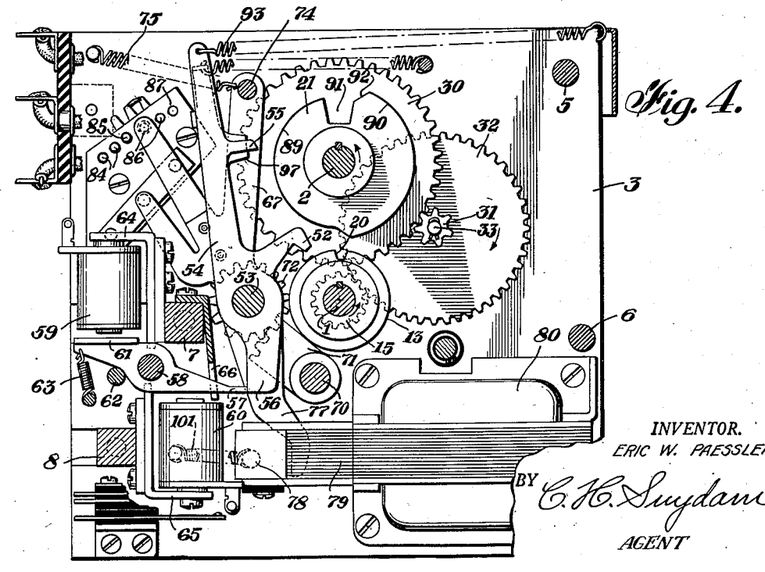
Fig. 4 is a sectional view of Fig. 2 taken from the plane 4—4.

Referring to Figs. 3 and 4 the angular position of notch 20 of cam 13 relative to any fixed reference radius of shaft 1 determines the point where the shaft is stopped from rotating. Actual stoppage occurs when the detent 52 drops into notch 20 as the result of the operation of the detenting mechanism.

On shaft 53 is mounted a plurality of detent arms 54. These arms are free to rotate on shaft 53 under the control of certain latches, stops, and tension springs. Each detent arm 54 has mounted thereon two spaced lugs 52 and 55 and an extension 56 on the opposite side of the shaft 53 from the spaced lugs. The extension 56 is in operative relation with a latch 57. The latch 57 is pivoted on shaft 58 and is under the control of one of a plurality of electro-magnets 59 or 60. The electro-magnet, when energized, attracts the armature 61, the latter being integral with latch 57. When the electro-magnet is de-energized the latch is normally held against a stop or rod 62 by the tension spring 63.

In the interest of economy of space the electro-magnets are divided into two banks, that bank comprising electro-magnets 59 being mounted on the spacing member 7 and the bank comprising electro-magnets 60 being mounted on the spacing member 8. Alternate latches, all of which are mounted on shaft 58, are in cooperative relation with the electro-magnets of a single bank. This construction is clearly shown in Fig. 2. Referring again to Fig. 4 the L-shaped members 64 and 65, which form the individual return magnetic paths for the electro-magnets 59 and 60 respectively, have slots cut therein and the latches 57 are mounted so as to fit into these slots, thus preventing longitudinal motion along the shaft 58. To further assist in the prevention of said longitudinal motion, a comb 66 is mounted on spacing member 7, the latches 57 being constrained to move in the spaces between the teeth of the comb.

Figure 5:
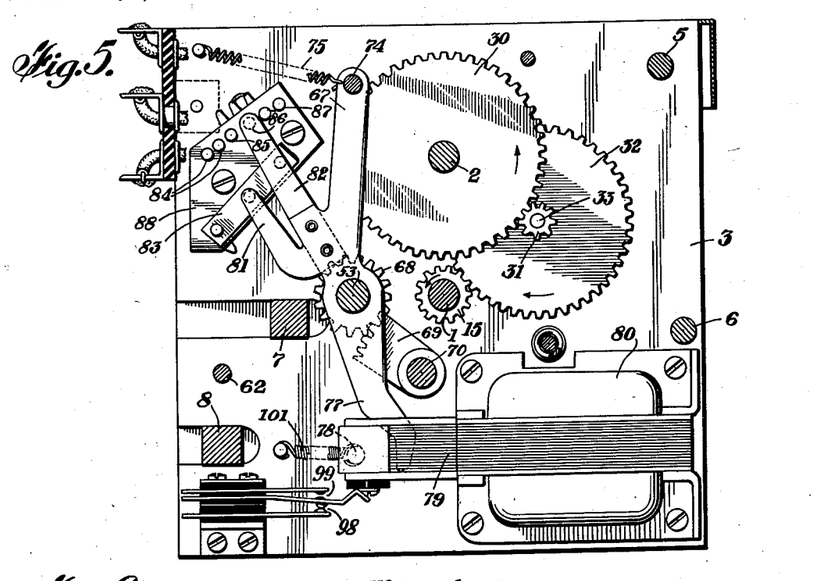
Fig. 5 is another sectional view of Fig. 2 taken from the section 5—5.
Figure 6:
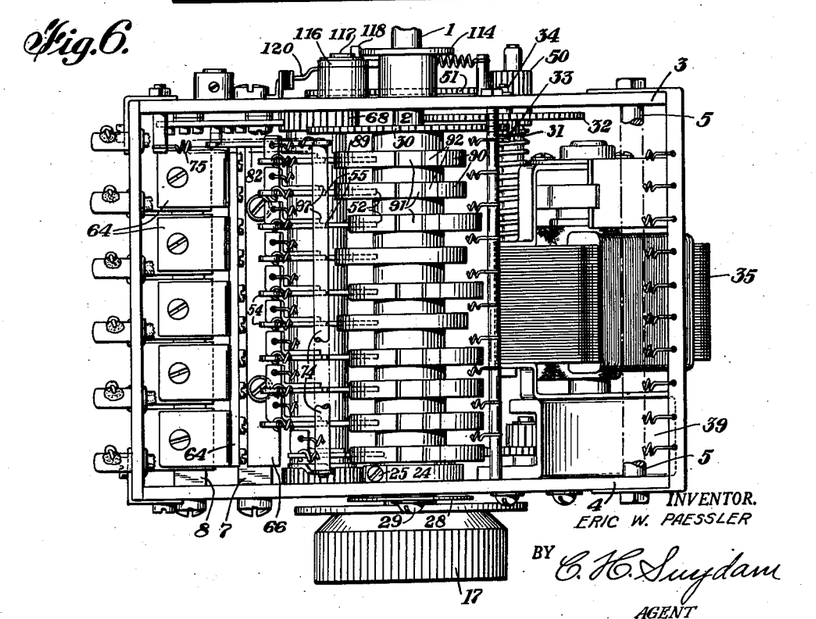
Fig. 6 is a top view of the apparatus as shown in Fig. 1 and taken from plane 6—6.

As best illustrated on Figs. 3, 4, and 5 there is shown mechanism for placing all of the detent arms in an off or inoperative position where they are held by the latches 57 bearing against extension 56.

This mechanism comprises a lever 67 which is rigidly fastened to gear 68, the latter being free to move on shaft 53. Gear 68 meshes with a sector gear 69 mounted on shaft 70. The shaft 70 extends across the frame of the apparatus and is journaled in frame members 3 and 4. The lever and gears just described are positioned immediately within the frame adjacent the frame member 3. Immediately within the frame member 4 is a second sector gear 71 which meshes with gear 72. Rigidly connected with gear 72 is a lever 73. Between levers 67 and 73 is a reset shaft 74, which is always constrained by tension spring 75 to bear against at least one of the detent arms 54. An extension 76 of lever 73 permits manually resetting all of the detent levers to their off position. For automatic operation, an arm 77 of the lever 67 extends to a position where it may engage with a pin 78 extending from the armature 79 of a release magnet 80.

There is also insulatingly mounted on lever 67 a pair of electrically connected spring contact members 81 and 82, see Fig. 5. Member 81 carries a contact which slides along contact strip 83 making a continuous electrical contact therewith. Member 82 carries a contact which slides over the surface of a plurality of contacts 84, 85, 86 and 87 mounted on the terminal board 88. The members 81 and 82 and the contacts on the terminal board 88 make up the control switch shown on the wiring diagram of Fig. 11. The function of this switch and its operation will be explained hereinafter.

Referring to Figs. 3 and 4 the operation of lug 55 of detent arm 54 together with cooperating cam 21 will now be explained. It will be seen that the cam 21 comprises two sectors, each slightly less than 180°. The cam surface 89 of one sector has a smaller radius than the cam surface 90 of the second sector. Between the sectors there is a notch 91 which is considerably wider than the notch 20 in the cam 13, the latter being mounted on the shaft 1. Between the notch 91 and the cam surface 90 there is a sloping surface 92. This sloping surface serves to reverse the direction of rotation of the cam under certain operating conditions.

Referring to Fig. 3 let it be assumed that the electro-magnet 59 attracts armature 61 thereby disengaging latch 57 from extension arm 56, thus permitting the detent arm 54 to be pulled to the right under the action of tension spring 93. The motion of the detent arm 54 is arrested when lug 55 makes contact with the cam surface 89. The motion of detent arm 54 carries with it the reset shaft 74. The motion of the reset shaft operates the spring contact members 81 and 82 and contact 82 comes to rest on contact 86. The contact 86 is constructed as two separate contacts purely for mechanical reasons. The overall motion of contact member 82 and lug 55 with respect to the positions that said lug may take on the various surfaces of cam 89 is such as to make it expedient to make contact 86 as shown. The same construction is also employed for the idle or off contact 84.

The closing of contacts 82—86 results in the energization of the driving motor 35 and cams 13 and 21 begin a counter-clockwise rotation in the direction of the arrow. As above stated cam 13 makes 24 revolutions to one revolution of cam 21. During this period the notch 20 may pass several times beneath the lug 52. However, this lug cannot drop into the notch since it is restrained from doing so by the lug 55 bearing on the cam surface 89. The motion of the lug 55 toward the surface 89 is such that the lug 52 almost, but not quite, makes contact with the surface of cam 13. Cam 21 continues to rotate until the leading edge of notch 91 becomes aligned with the edge of the lug 55. At this moment lug 55 drops a limited distance into the notch 91 and lug 52 then rides directly upon the surface of cam 13. This condition is illustrated in Fig. 10. During the time that the lug 55 passes from the leading edge to the following edge of notch 91 cam 13 may make one complete revolution. However, during this period the notch 20 will again pass the lug 52 at which time the lug falls into the notch, and shaft 1 is arrested. When lug 52 engages notch 20 detent arm 54 and contact member 82 move further to the right until the contact with contact 86 is broken. There is then no further action of the apparatus except the slowing down of the motor by the friction disc as hereinbefore explained.

Now let us assume that at the beginning of any sequence of operation the motion of lug 55 is arrested by the cam surface 90 of the cam 21. Under these conditions it is clear that the detent arm 54 together with contact member 82 does not move as far to the right as in the former case. Arm 82 makes contact with contact 85 under these conditions, resulting in the motor rotating shafts 1 and 2 together with their respective cams in a clockwise direction. During a clockwise rotation the lug 55, after passing over the cam surface 90, rides down the sloping edge 92 into the notch 91. At this time the lug 52 again rides upon the surface of cam 13 and during the next revolution of the latter the notch 20 passes under the lug and the mechanism is arrested as before.

It will be seen that conditions may arise wherein the operation of the mechanism may be initiated at a time when the notch 91 is such that the lug 55 falls into it directly. Insofar as the direction of rotation of the cams is concerned this is equivalent to a counter-clockwise rotation since the contact member 82 will come to rest on contact 86. Inasmuch as not more than one revolution of cam 13 takes place while the lug 55 is within notch 91, it is apparent that the desired direction of rotation becomes critical at this point. If the center of lug 55 is to the left of the center of notch 91 when the lug 55 enters the notch, conditions are such that lug 52 will fall within notch 20 of cam 13 sometime during the next revolution of the latter cam. On the other hand if the center of lug 55 is to the right of the center of notch 91, the position of notch 20 is such that during its rotation it has already passed the point where it will engage lug 52 during the period when lug 55 is within notch 91. Under these conditions the rounded edge of lug 55 rides up the sloping edge 92 until it reaches the surface 90. This pushes detent arm 54 and contact member 82 to the left where the latter engages contact 85. This reverses the direction of the driving motor and of the cams. The cams are now rotating in a clockwise direction and the lug 54 retraces its path along the sloping edge 92, falls into the notch 91 and, during its motion across the notch, lug 52 enters notch 20 and the cycle of operation is complete.

In order to accurately center lug 55 within notch 91 a plurality of latch arms 94 is provided, one for cooperating with each detent arm 54. These latch arms are more clearly shown in Fig. 2. Each latch arm is tensioned by a spring 95 which tends to make the arm follow the movement of its cooperating detent arm. A lug 96, bent at right angles to the plane of the latch arm, engages the back edge of a cooperating detent arm. This lug arrests the motion of the latch arm so that a centering lug 97, also part of the latch arm, will not approach the cam surface and interfere with the operation of the mechanism. It will be seen that lugs 55 and 97 are symmetrically positioned about a center line. For accurately spacing lug 55 within the center of notch 91, cam 21 is rotated until the lug 97 is permitted to fall within the notch. This is done manually when adjusting the apparatus. Since the width of lug 97 is such that it mates with the notch 91, it will be seen that this condition can easily be obtained. It is also the condition, of course, wherein notch 20 will be engaged by lug 52.

The manner in which the control apparatus is adjusted so that it will automatically tune the inductor of a radio frequency circuit whereby said circuit will operate at any one of a plurality of predetermined frequencies will now be described.

It is assumed that the shaft 1 is coupled to a shaft within a single layer inductor and on said latter shaft there is mounted a grooved pulley which makes continuous contact with the turns of the inductor as the shafts rotate. The mechanism by which the grooved pulley is mounted on the shaft within the inductor is such that the pulley will also move longitudinally along the coil. This is in accordance with well known practice and is therefore not illustrated. In the specific embodiment of my invention illustrated by the accompanying drawings, I have shown ten pairs of control cams, detent mechanisms, etc. This will permit the radio frequency circuit to be tuned to ten different frequencies. It is convenient to progressively tune the circuits. For example, the cam mechanism nearest the adjusting knob 17 may be employed to tune the circuit to the lowest frequency, the next cam mechanism for the second lowest frequency, and so on to the tenth cam mechanism which will tune the circuit to the highest frequency.

Referring to Figs. 3 and 7, the extension handle 76 of lever 73 is pushed to the left thereby disengaging all of the detent arms 54. The wing nut 16 within the knob 17 is loosened. This releases the clamping force applied to the cams 13. One of the detent arms, for example, that one closest the knob 17 is released by manually raising the armature 61 of the corresponding latch 57. Knob 17 is rotated until centering lug 97 falls within notch 91 of cam 21 as above described. Lug 52 obviously falls within notch 20 at this time. At this point the radio frequency circuit will in general not be properly tuned. By further rotating knob 17 the circuit is brought into tune by, for example, watching the deflection of a meter which indicates resonance of the circuit. During this latter tuning period the pair of cams under adjustment have not rotated since they are held from so doing by the lug 52. However, the remaining cams on both of the control shafts are rotating during all of the adjustment period. The tuning of the radio frequency circuit to the first frequency having been completed the handle 76 is again moved to the left and all detent arms are placed in the off position. The armature 61 of the next or adjacent latch to the one which has just been employed to initiate the first setting is now raised thereby releasing the second detent arm. The knob 17 is turned until centering lug 97 of the second latch arm 94 engages the notch 91 and operation is continued in the same manner as with the first setting. After the second setting has been completed the same operation is continued until all of the cams and their associated detent mechanisms are properly adjusted for the desired predetermined frequencies. All of the cams associated with shaft 1 are now securely clamped in position by the wing nut 16 and the apparatus is ready for automatic operation which will now be described.

Figure 11:
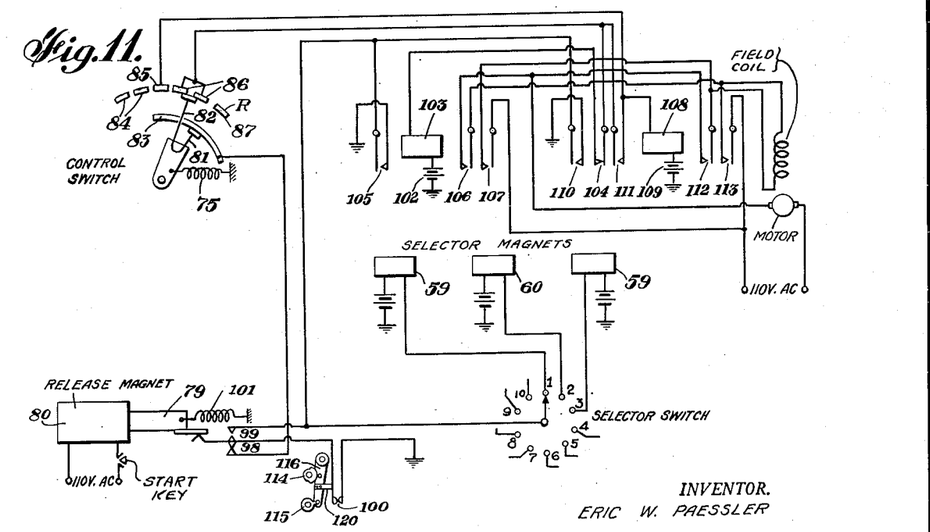
Fig. 11 is a schematic circuit diagram showing the interconnection of certain magnets, relays, switches, etc., required for the operation of my invention. The mechanical disposition of these units is illustrated in the various sectional views.

Fig. 11 is a schematic diagram showing the selector magnets, relays, control and selector switches, etc. for the automatic operation of my automatic control device. A ten position selector switch and a start key may be mounted in any convenient location. This switch and key are separate units from my control device but all of the other magnets, relays, etc. are illustrated in the various figures of the drawings.

The selector switch is set for a desired frequency to which the radio frequency circuit is to be tuned, say position 1, connected with one of the selector-magnets 59. The start key is momentarily depressed. This energizes the release magnet 80 whose armature 79 is thereby attracted and contacts 98 open and contacts 99 close. At the same time the mechanical linkage between armature 79 and the contact members 81 and 82 urges the latter to the extreme left of their travel. The closing of contacts 99 completes a circuit from ground, a battery or power source, the winding of the selector magnet 59, through position 1 of the selector switch, contacts 99, contacts 100, to ground. The operation of the selector magnet 59 releases the cooperating detent arm 54 which as above described moves to the right until lug 55 comes to rest on a cam surface, let us assume surface 89 of cam 21. This is the low surface of the cam. As a result of this motion the contact arm 82 of the control switch comes to rest on contact 86. It is understood that this latter motion of the contact arm 82 can only occur when the start key is released and the relay magnet 80 is de-energized thus permitting the armature 79 to be returned to its original position through the agency of the tension spring 101. Reclosing of contacts 99 completes a circuit from ground through battery or power source 102, relay 103, contacts 104, contacts 86 and 82, the sliding contact between contact arm 81 and the bar 83, contacts 98, contacts 100, to ground. The operation of relay 103 closes contacts 105, the latter functioning as holding contacts for the selector magnet 59. The operation of relay 103 also closes contacts 106 and 107 and the motor operates so as to rotate the cams 13 and 21 in a counter-clockwise direction. The motor circuit may be traced from the 110 volt A.-C. power source, through contacts 107, the motor field coil, contacts 106, through the motor armature, to the other side of the A.-C. source. The motor operates until the lug 52 engages the notch 20 of cam 13, at which time the detent arm 54, which is mechanically interlinked with switch arm 82, moves the latter to the right until the contact between contacts 86 and the arm 82 is broken. This stops the motor as above described and the cycle of operation is complete.

If it should happen that the lug 55 of detent arm 54 should come to rest on the cam surface 90 of cam 21, the following action takes place. It will be observed that the surface 90 is the high surface of the cam and therefore contact arms 81 and 82 come to rest so that the latter makes contact with contact 85. The closing of this latter contact energizes the relay 108 through a circuit from ground, battery 109, the winding of relay 108, contacts 85 and 82, the contact between arm 81 and the bar 83, contacts 98, contacts 100, to ground. The closing of relay 108 closes contacts 110 which act as a holding contact for the selector magnet. The closing of relay 108 also opens contacts 104 and closes contacts 111, 112 and 113 which in turn close a circuit through the motor in a manner such that the latter rotates in a clockwise direction. The circuit through the motor may be traced from the 110 volt A.-C. power source, contacts 113, the field coil of the motor, contacts 112, the motor armature, to the other side of the A.-C. source. The opening of contacts 104 prevents relay 103 from becoming energized as long as relay 108 remains closed. Also, the closing of contacts 111 places the contacts 85 and 86 of the control switch in parallel. Therefore, as contact arm 82 moves between contacts 85 and 86, there is no interruption of the circuit which energizes relay 108. The operation of contacts 104 and 111 thus prevents a reversal in the direction of rotation of the motor as the lug 55 travels down over the sloping surface 92 to a position which would normally cause the motor to operate the cams in a counter-clockwise direction. The motor operates until the detenting action has taken place and the cycle is completed.

If the lug 55 of the locating arm 54 should fall within the notch 91 in such a position that it is on the right hand side of the notch the following action takes place. Relay 103 energizes and the motor operates to rotate the cams in a counter-clockwise direction since the arm 82 makes contact with contact 86. The rotation of cam 21 causes the lug 55 to travel over the sloping surface 92 until it reaches the surface 90. This action breaks the contact between arm 82 and the contact 86 and makes contact between the arm 82 and contact 85. Relay 108 becomes energized and opens contact 104 thereby releasing relay 103. The energizing of relay 108 causes the motor to operate so as to rotate the cams in a clockwise direction. This rotation continues until the detenting action has taken place and the cycle of operation is complete.

In the above description, the contours of the cam surfaces have been described as having "notches" which, with certain cooperating lugs, comprise the detent mechanisms. Other cam contours for the detenting devices could also be employed, e. g., the cams could have lugs in place of notches on their periphery and the lugs could engage with suitable notches on the detent arms.

Figure 9:
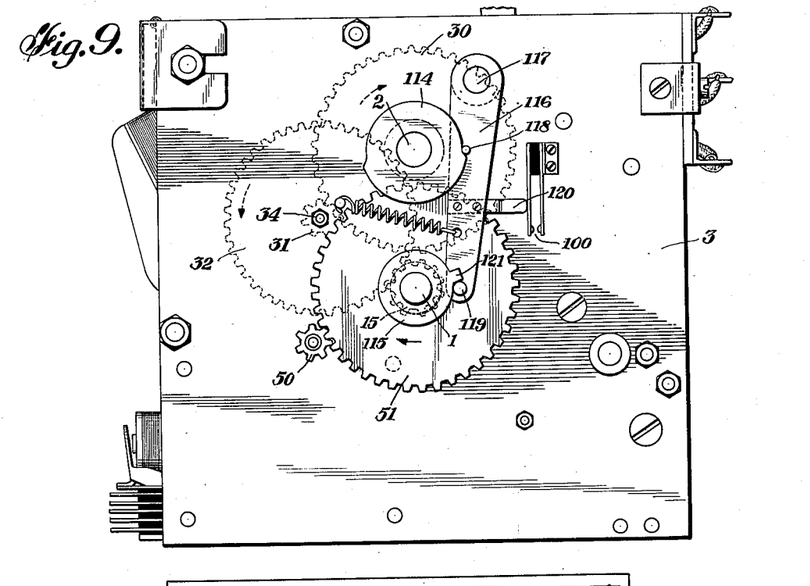
Fig. 9 is an end elevation taken from plane 9—9 of Fig. 2.

So far I have not described a safety switch which prevents the control apparatus rotating the above mentioned grooved pulley beyond the ends of the inductor under adjustment. Referring to Figs. 8 and 9, a cam 114 is mounted on the end of shaft 2 and a stop disc 115 is mounted on the end of shaft 1. A lever 116 is pivoted on the shaft 117. Two pins 118 and 119 are positioned on the lever 116 as illustrated. Pin 118 is constrained to ride over the surface of cam 114 by a tension spring connected to lever 116. Mounted on the end frame 3 is a pair of contacts 100, these contacts being operated by an insulating bar 120 mounted on the lever 116. It will be recalled that shaft 1 makes 24 revolutions for one rotation of shaft 2. However, one of the objects of my invention is to devise an apparatus which will operate in a minimum time and, therefore, any cam 21 on shaft 1 will never make more than a 180° rotation since a lug 55 always moves toward the notch 91 over the shortest route. In effect this is equivalent to limiting the maximum number of rotations of shaft 1 to one-half of 24 or 12. Due to practical expediencies, such as the relative wide width of notch 91, etc., the actual number of rotations of shaft 1 is preferably limited to ten. In the present instance this means that the maximum number of turns over which an inductor may be adjusted is ten.

The cam 114 also has a high and a low sector and the high sector permits a maximum number of ten revolutions of shaft 1 before the safety switch operates to disconnect the power supply. Both electrical and mechanical safety is provided. When the pin 118 rides on the low surface of cam 114, contacts 100 are open and the apparatus cannot function. Likewise, the engagement of lug 121 of stop disc 115 with pin 119 prevents the further rotation of shaft 1. When the pin 118 rides on the high surface of cam 114 lever 116 is pushed to the right thereby closing contacts 100 and the apparatus will operate in the desired manner. It will be observed that the riding of pin 118 on the high side of cam 114 also prevents any engagement between the pin 119 and the stop 121. In Fig. 9 the position of the safety switch is shown just after the shaft has reached one extreme of its travel. The pin 118 has just moved from the high to the low sector of cam 114 and lug 121 has just engaged pin 119.

My invention has been described primarily as a mechanism for automatically tuning radio frequency circuits to predetermined frequencies. It is obvious, however, that the apparatus could also be used in any arrangement wherein a predetermined setting of any movable part is required and it is intended that the scope of my invention be not limited except in accordance with the following claims.

What is claimed is:

1. Rotary position determining control apparatus comprising a plurality of control shafts, a plurality of sets of cams mounted in predetermined relative position on said shafts, one cam of each set of cams being mounted on a separate shaft of said plurality of shafts, means for rotating said shafts at different relative speeds, means for selecting the direction of rotation of said shafts, a notch on the cam surfaces of each cam of each set of cams, a given inclined portion on one of said cams, a detent cooperating with said inclined portion to determine direction of shaft rotation a plurality of detent means, one for each set of cams, each detent means being positioned and operative for potential engagement with the notches on one set of cams, selector means for initiating the operation of at least one of said detent means so that when as a result of said rotation said notches are in a predetermined relative position with respect to said one of said detent means said engagement takes place, and means for stopping the rotation of said shafts in response to said engagement.

2. Rotary position determining control apparatus in accordance with claim 1 wherein said detent means comprises a plurality of detent arms, two spaced lugs on each arm for engagement with said notches, the notch on the cam surface of one cam of one pair of cams being wider than the width of its cooperating lug, whereby, during the engagement of said last mentioned notch and lug, the notch in the other cam of said pair of cams makes one complete revolution.

3. Rotary position determining control apparatus in accordance with claim 1 in combination with means for placing all of the detent means in an inoperative position prior to the operation of a selected one of said detent means.

4. Rotary position determining control apparatus comprising a first shaft adapted for a rapid rotation, a second shaft adapted for a slower rotation than said first shaft, means for rotating said shafts at fixed relative rates, a plurality of cams adjustably mounted on said first shaft, a like plurality of cams adjustably mounted on said second shaft, each of the cams on one shaft being in operative relation with a cam of the other shaft thereby forming operative pairs of cams, a notch on the cam surface of each cam of each pair of cams, a plurality of detent means, each detent means comprising a detent arm carrying two spaced lugs for engagement with the notches on one pair of cams when said notches are in a predetermined position relative to said lugs; means for determining the direction of rotation of said shafts comprising high and low arcuate segments on each cam of said second shaft, the notch in said each cam, and a sloping portion between the notch and said high segment, said last mentioned notch being wider than its cooperating lug; and means for stopping the rotation of said shafts in response to an engagement between the two lugs of any detent arm and their cooperating notches.

5. Rotary position determining control apparatus in accordance with claim 4 in combination with additional means for adjusting each of said detents and their cooperating cams to their predetermined positions for permitting said engagements.

6. Rotary position determining control apparatus in accordance with claim 4 in combination with means for adjusting each of said detents and their cooperating cams to their predetermined positions for permitting said engagements, said means comprising a plurality of latch arms, one latch arm cooperating with one detent arm, a centering lug on each latch arm, said centering lug engaging a notch on a cooperating cam when the notch which is wider than its cooperating lug is in a predetermined position with respect to said last named lug.

7. Rotary position determining control apparatus comprising a plurality of control shafts, a plurality of sets of cams mounted in predetermined relative position on said shafts, one cam of each set of cams being mounted on a separate shaft of said plurality of shafts, means for rotating said shafts at different relative speeds, means for selecting the direction of rotation of said shafts, a notch on the cam surfaces of each cam of each set of cams, a plurality of detent means, one for each set of cams, each detent means being positioned and operative for potential engagement with the notches on one set of cams, selector means for initiating the operation of at least one of said detent means so that when as a result of said rotation said notches are in a predetermined relative position with respect to said one of said detent means said engagement takes place, means for stopping the rotation of said shafts in response to said engagement, said means for determining the direction of rotation of the control shafts comprising a plurality of cams, said plurality comprising one cam of each set of cams, said plurality of cams having irregular profile surfaces, and a plurality of locator means for riding over the surfaces of said plurality of cams, one of said locator means being selected for operation by the selector means initiating the operation of one of the detent means.

8. Rotary position determining control apparatus comprising a plurality of control shafts, a plurality of sets of cams mounted in predetermined relative position on said shafts, one cam of each set of cams being mounted on a separate shaft of said plurality of shafts, means for rotating said shafts at different relative speeds, means for selecting the direction of rotation of said shafts, a notch on the cam surfaces of each cam of each set of cams, a plurality of detent means, one for each set of cams, each detent means being positioned and operative for potential engagement with the notches on one set of cams, selector means for initiating the operation of at least one of said detent means so that when as a result of said rotation said notches are in a predetermined relative position with respect to said one of said detent means said engagement takes place, means for stopping the rotation of said shafts in response to said engagement, said means for determining the direction of rotation of the control shafts comprising a plurality of cams, said plurality comprising one cam of each set of cams each cam of said plurality of cams having an irregular profile surface including one of said notches, and a high and a low arcuate segment, and a sloping portion between said one of said notches and said high arcuate segment; and a plurality of locator means adapted to ride over the surfaces of said plurality of cams, one of said locator means being selected for operation by the selector means initiating the operation of one of the detent means.

ERIC W. PAESSLER.

REFERENCES CITED

The following references are of record in the file of this patent:

UNITED STATES PATENTS

| Number | Name | Date |
|---|---|---|
| 2,249,753 | Elliott | July 22, 1941 |
| 2,285,414 | Collins | June 9, 1942 |
| 2,320,867 | Hill | June 1, 1943 |
| 2,334,724 | Paessler | Nov. 23, 1943 |
| 2,356,905 | Zenner | Aug. 29, 1944 |
| 2,391,470 | May | Dec. 25, 1945 |